June 6, 1961 A. W. LAPINS ET AL 2,986,828
COMBINATION SCARIFIER-SCRAPER
Filed Aug. 5, 1959 2 Sheets-Sheet 1

INVENTORS.
ALVIN W. LAPINS &
BRANTFORD G. ELLIOTT
BY
Wolfe Hubbard Voit & Osann
ATTORNEYS.

INVENTORS.
ALVIN W. LAPINS &
BRANTFORD G. ELLIOTT
BY
Wolfe Hubbard Voit & Osann
ATTORNEYS.

United States Patent Office 2,986,828
Patented June 6, 1961

2,986,828
COMBINATION SCARIFIER-SCRAPER
Alvin W. Lapins, Fresno, Calif., and Brantford G. Elliott, Northville, Mich., assignors to Massey-Ferguson Inc., Racine, Wis., a corporation of Maryland
Filed Aug. 5, 1959, Ser. No. 831,748
8 Claims. (Cl. 37—145)

The present invention relates to a tractor mounted implement and more particularly to means for leveling and contouring the surface of the ground.

In grading for landscaping purposes and the like a tractor is usually employed having a scraper blade either mounted in front or behind for forceably removing or scalping a desired thickness of crust from the ground. The necessary weight to insure penetration plus the large tractive effort to move the blade in clay or hard packed soil frequently requires use of a tracked "bulldozer." However, in the contouring and moving of earth it is desirable to be able to accomplish the same effect using a considerably lighter, wheeled vehicle, for example, a light farm tractor equipped with the well-known "Ferguson type" of draft linkage. It is also desirable to reduce the necessity for forced penetration and large tractive effort by preliminarily scarifying the surface of the ground, i.e., breaking it up to a shallow depth so that it is more readily acted upon by the blade. Moreover it is desirable to be able to retract the scarifying blades completely out of ground engagement while maintaining the scraper blade rigidly coupled to the tractor draft linkage when simple scraping or transporting of surface dirt is required.

Accordingly it is an object of the present invention to provide a novel combination scarifier-scraper which may be attached to a standard draft linkage and which produces an efficient combination of scarifying and scraping action for loosening and removal of clay or hard packed earth. It is another object to provide a combination scarifier-scraper in which the scraper is maintained in contact with the ground but in which the scarifier may be locked in alternative positions either in ground engagement or elevated out of ground engagement where scraping only is desired.

In one of the aspects of the invention it is an object to provide a novel scraper construction in which the scraper is locked in upright position, with sidewalls for retaining the dirt loosened by the scarifying blades and gathered by the scraper blade to provide high capacity transport. It is a related object to provide a combination scarifier-scraper which is capable of loosening and moving surface dirt at a rate which compares favorably with that experienced when using considerably heavier tracked equipment.

It is a more specific object of the present invention to provide a combination scarifier-scraper in which the scarifier is closely coupled to the regular tractor draft links and in which the scraper is secured thereto by a flexible linkage, with means for rigidifying such linkage to lock the scarifier blades in alternative active and inactive positions relative to the scraper, which continues to rest upon the ground. In this connection it is an object to provide a scraper blade which is coupled to the scarifier by a set of upper and lower horizontal links forming a parallelogram and in which novel means are provided for locking the parallelogram linkage in alternate positions in both of which the scraper blade becomes a rigid unit with respect to the tractor draft links for raising and lowering by the latter.

Finally it is an object to provide a novel scarifier-scraper which is simple and easy to operate and which provides for locking in the two alternative positions by the tractor operator from the tractor seat, as by triggering a latch bar, without having to dismount.

Other objects and advantages of the invention will become apparent upon reading the attached detailed description and upon reference to the drawings in which.

While the invention has been described in connection with a preferred embodiment, it will be understood that I do not intend to be limited to such embodiment but intend to cover the various alternative and equivalent constructions included within the spirit and scope of the appended claims.

Figure 1:
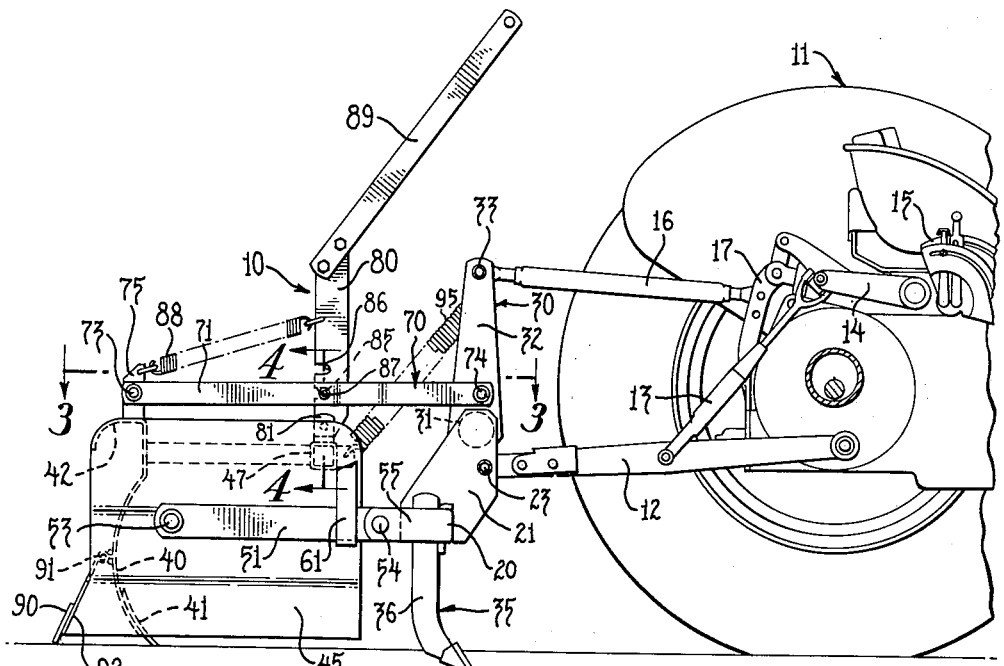
FIGURE 1 shows a scarifier-scraper constructed in accordance with the present invention with the same attached to the tractor and with the tractor shown only fragmentarily to reveal the details of construction.

Turning now to FIGURE 1 of the drawings, the scarifier-scraper indicated generally at 10 is shown secured to a tractor 11, the rear end portion only of which is shown. The tractor will be recognized as a well-known agricultural tractor having a pair of draft links 12 trailingly pivoted from the rear end portion and laterally spaced from one another (see also FIG. 3). The draft links are supported by respective drop links 13 connected to lift arms 14. The lift arms 14 are raised and lowered by an internal power lift hydraulic mechanism (not shown) with quadrant lever controls 15. Centered between the trailing draft links 12 and spaced above them is a compression link 16 connected to a force transmitting lever 17.

Figure 2:
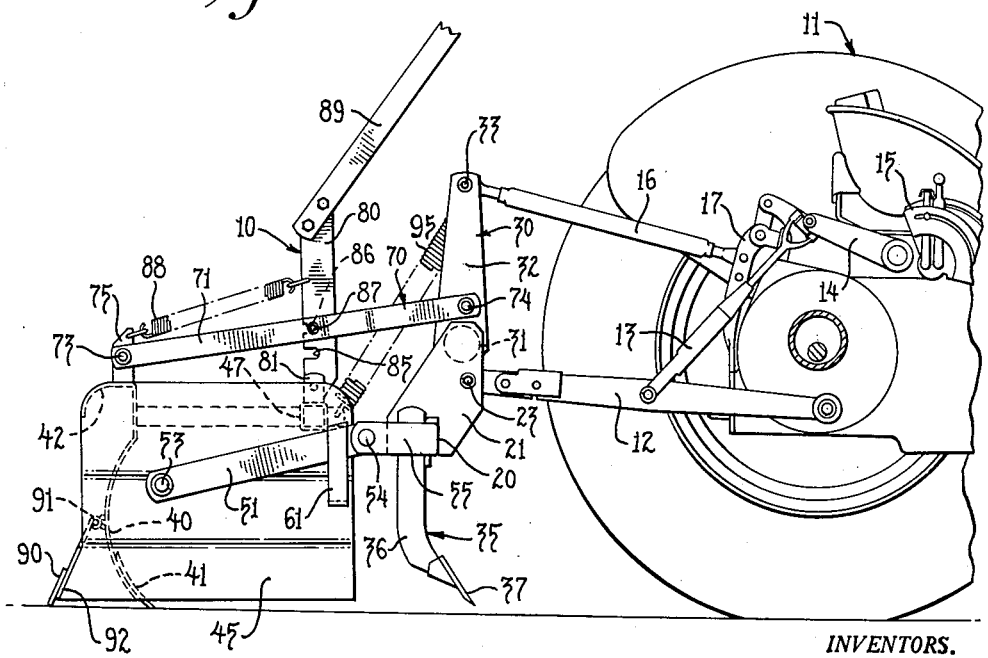
FIG. 2 is a view similar to FIG. 1 but showing the alternative mode of operation with the scarifier maintained upraised clear of the ground and with the scraper only in operation.

As will be understood by one skilled in the art, the force in the compression link 16 is commonly utilized for controlling the power lift mechanism to cause raising of the draft links in accordance with the force applied to the compression link. However, in the present device such "draft control" need not be employed; the links are simply raised and lowered between the position shown in FIG. 1 and that shown in FIG. 2.

Figure 3:
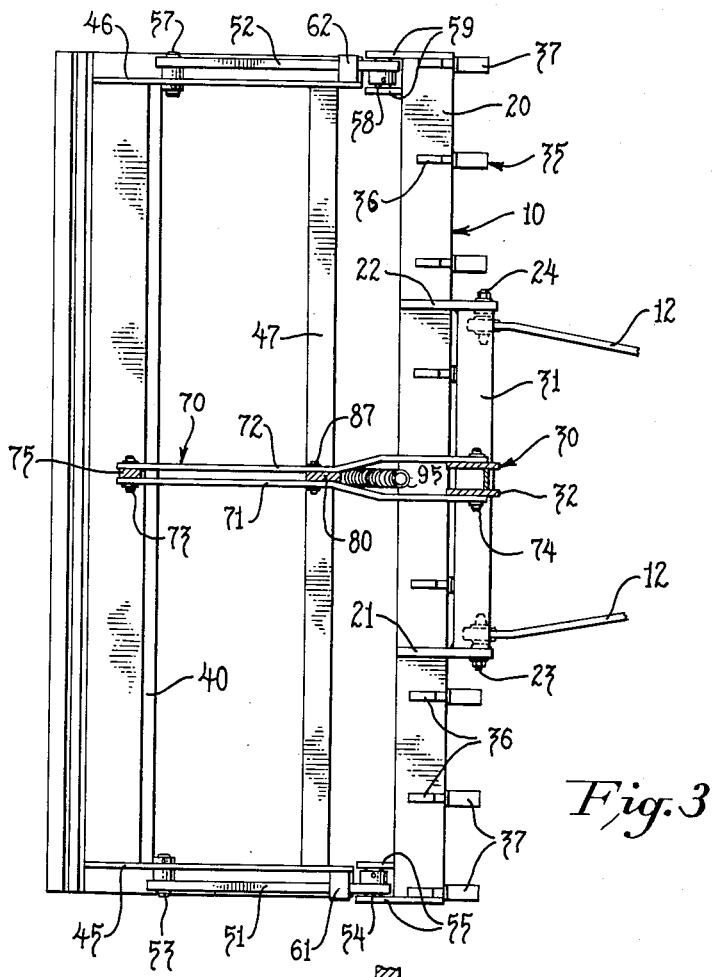
FIG. 3 is a top view of the scarifier-scraper looking along the line 3—3 in FIG. 1.
Figure 4:
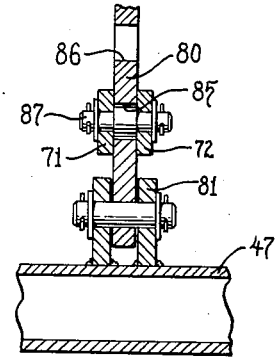
FIG. 4 is a fragmentary section taken through the latch bar and looking along line 4—4 in FIG. 1.

With the tractor construction generally in mind, attention may next be given to the implement itself. As shown in FIG. 3 the implement includes a transversely extending tool bar 20 which extends the width of the tractor and which has brackets 21, 22 which serve to pivot the tool bar to the trailing ends of the draft links. In the present instance the brackets may be formed of plates of metal which extend vertically and which are welded or otherwise rigidly secured to the top surface of the tool bar. The pivots thereon are indicated at 23, 24 respectively.

For the purpose of completing the connection to the draft linkage, a vertical frame 30 is provided which is pivoted at its upper end to the compression link 16. Such vertical frame is of inverted T shape including a horizontal member 31 which extends rigidly between the brackets 21, 22 and a vertical post 32. As is brought out in FIG. 3 the latter preferably consists of two vertical plates of metal suitably spaced from one another and carrying a pivot 33 at the upper end.

To provide the desired scarifying action, the tool bar 20 includes a set of scarifier blades 35 which may, for example, be eight in number, each having a shank 36 which extends downwardly terminating in a chisel shaped blade 37. Since the chisel shaped blades are relatively narrow and downwardly angled, the draft force is concentrated at the tips of the blades and the blades thus tear into the surface of the ground destroying the integrity of the crust and making it broken and irregular to a shallow depth so that the scraper which follows has efficient "purchase" upon the ground facilitating penetration of the ground by the scraper between the "furrows" of the scarifier blades.

Arranged parallel to the tool bar 20 and spaced behind it in vertical position is a scraper blade 40 having a contour as shown in FIG. 1. The tip may be reinforced as indicated at 41 and the upper portion is bent rearwardly as indicated at 42 to provide stiffness and lateral rigidity. In carrying out the invention the scraper 40 is provided with end panels 45, 46 which are of generally rectangular shape and which, together with the scraper blade 40, provide a "box" which is opened at the front and at the bottom for retaining the dirt in front of the blade. Bridging the end panels is a reinforcing cross member 47 butt-welded to the inside surfaces of the end panels. The lower edges of the end panels are preferably upraised with respect to the tip of the blade to provide clearance for penetration of the blade into the ground.

In accordance with the present invention the scraper and scarifier are coupled together by a parallelogram linkage consisting of upper and lower horizontal links with means for rigidifying the linkage in two positions, a first position in which both the scarifier and scraper are in ground engagement and a second position in which only the scraper is in ground engagement. Thus, for the purpose of coupling the blade to the tool bar, a pair of lower horizontal links 51, 52 are provided. Taking link 51 by way of example, it is pivoted at its rear end to the scraper blade to apply tractive force at a point approximately midway of the height of the blade. More specifically, at its rear end the link 51 is pivoted to the rear portion of the end panel 45 at a pivot 53. At its forward end the link 51 is pivoted at 54 to the tool bar 20. To provide support for the pivot 54, the tool bar has a bracket 55 at its end consisting of two parallel plates of metal welded or otherwise secured to the end of the tool bar and which are spaced apart in the manner of a clevis for reception of the front end of the link 51.

At the other end of the tool bar the horizontal link 52 is similarly attached. That is to say, its rear end is pivoted to the end panel 46 of the scraper box at a pivot 57 while the front end is pivoted to the tool bar at a pivot 58 mounted on a tool bar bracket 59.

For the purpose of guiding the horizontal links 51, 52, retaining straps 61, 62 are provided. The latter are vertically arranged at the front edges of the end panels and are spaced therefrom to form a slot within which the links 51, 52 have limited vertical movement.

To complete the parallelogram, an upper horizontal link 70 is provided extending in a fore and aft direction and centered above the lower horizontal links 51, 52. The upper horizontal link 70, which preferably consists of two straps of metal 71, 72 spaced apart as shown in FIG. 3, is pivoted at its rear end 73 to the upper edge of the scraper 40. Preferably the pivot is on an upstanding bracket 75 welded to the upper edge of the scraper blade. At its forward end the horizontal link 70 is pivoted, as shown at 74, to the vertical post 32 which extends upwardly from the tool bar.

Thus, it will be appreciated by one skilled in the art that the lower horizontal links and upper horizontal link taken together define a parallelogram linkage, the corners of which are defined by the pivot points 53, 54 and 73, 74 respectively.

In carrying out the invention the linkage is rigidified by latching the upper link 70 to the scraper frame in a first position in which both devices engage the ground and with provision for locking in a second position in which the scarifier is held upraised with only the scraper in contact with the ground. In the preferred embodiment the parallelogram linkage is locked by means of a vertical latch bar 80 which is coupled to the scraper at its lower end and which has means for rigidly engaging the upper horizontal link at two different levels. The latch bar 80 is sandwiched between the two parallel elements 71, 72 which form the link 70 and pivoted at its lower end on a bracket 81 which is welded or otherwise secured to the center of the forward cross member 47 of the scraper. To couple the latch bar to the upper horizontal link 70, a pin-and-notch connection is used. The notches indicated at 85 and 86 are formed at two different levels along the rear edge of the latch bar for engaging a pin 87 in the link. In order to bias the latch bar 80 into the pin engaging position, a coil spring 88 is used which is secured at its rear end to the scraper, with the forward end being hooked onto the central portion of the latch bar. And to enable the latch bar to be released from the tractor seat without necessity for the operator to dismount, the latch bar includes an upwardly extending and forwardly angled release arm 89 which is bolted or otherwise secured to the upper end of the latch bar.

With the latch released and thus with the parallelogram linkage free to move, the scraper would be simply towed behind the scarifier in vertical position. However, the latch locks together adjacent elements of the parallelogram, here the top and left-hand elements, so that the parallelogram becomes rigid and forms a rigid rearward extension of the tool bar and scarifier assembly, regardless of the notch which may be selected in the latch bar. When the upper horizontal link engages the lower notch 85 in the latch bar, and with the scarifier in its lower, ground-engaging position, both of the portions of the implement are coupled to the tractor draft and supporting linkage and thus act as a unit in dislodging, scraping and transporting of dirt. The particular location of the notch 85 on the latch bar determines the operating depth of the scarifier blades relative to the scraper. Consequently the scarifier tends to dig into the crust of earth digging up some of it and destroying its integrity so that the crust may be more easily scalped and smoothed by the action of the following scraper blade. During this operation the regular quadrant control lever is set to its maximum depth position so that the depth control is ineffective. The weight of the entire implement and the "suck" of the scarifier blades are both applied to the edge of the scraper blade to maintain it in scraping engagement with the ground.

Because of the end panels forming a part of the scraper assembly, dirt is not spilled out of the sides but may be transported efficiently in large quantities from point to point. When it is desired to dump the collected dirt, the tractor operator operates the quadrant lever 15 which swings the tractor linkage into a fully upraised position in which both the scarifier and scraper are well clear of the ground. Since the scraper assembly is bottomless this deposits the collected dirt. Where it is desired to distribute the collected material over an area, the "position control" portion of the quadrant control arrangement may be employed as set forth, for example, in Bunting application Ser. No. 451,276, filed August 20, 1956. This enables the scraper and scarifier to be lifted clear of the ground only by a small amount, say, a few inches. This deposits the dirt from the scraper gradually to form a rather even layer on the ground. It will be apparent then that the above described arrangement is particularly useful in grading operations or the like where earth has to be removed to only a limited depth and either transported to or distributed in another, usually adjacent, location.

The scarifiers are effective to break up the surface even where the surface consists of hard packed clay. Since they are relatively narrow, they require only a limited amount of draft force to their work. The present construction enables grading formerly done by heavy tracked vehicle to be accomplished by a relatively light farm tractor with the added flexibility of "scraper only" operation.

In order to transport the vehicle to the job, the latch bar is put in the position shown in FIG. 1 so that the entire implement may be lifted clear of the roadway as the tractor draft and supporting linkage is raised. The rearwardly overhanging weight is not a troublesome factor since, as it will be clear from the drawings, the entire implement may be rather lightly constructed and of limited weight.

In practicing the invention, the parallelogram linkage may be locked in its second position by engaging the pin 87 with the second notch 86 on the latch bar. This mode of operation is desirable where use of the scarifier is not required, either because the earth is loose or because the scraper is being used for the final leveling step. In this position the parallelogram linkage is jack-knifed upwardly but is, nevertheless, rigid with respect to the tool bar. Consequently the scraper in the condition of FIG. 2 actually supports the tool bar and scarifier out of ground engagement, without necessity for support by the tractor draft links. Moreover, the weight of the entire implement, including the scarifier, is utilized to keep the scraper blade in digging contact with the ground so that it does not tend to bob up and thus spill some of the dirt when striking an irregularity such as a lump of sod or the like. The scraper under the condition of FIG. 2 may be operated in much the same manner as conventional scrapers and since there is a rigid connection with the tractor draft links, the entire implement may be raised to deposit the collected dirt at the will of the operator and under the control of the quadrant lever arrangement.

Upon striking a hard packed section, or wherever else it is desired to employ the scarifier blades, the release arm 89 is simply pulled forwardly by the tractor operator reaching back from his seated position. This allows the parallelogram to become flexible again so that the scraper no longer is acting to support the scarifier, and the scarifier is thus free to drop down into contact with the ground. To insure that the scarifying blades drop and dig in promptly, an auxiliary coil spring 95 is provided between the cross member 47 of the scraper and the top of the post 32 associated with the scarifier blades. In effect, a portion of the weight of the scraper is utilized to pull the scarifier blades down to active position. In addition, movement of the tractor causes the scarifier blade to dig in, thus lowering the tool bar to the point where the upper horizontal link falls into register with the notch 85, whereupon the force of bias rocks the latch bar rearwardly for engagement of the pin 87 and the notch 85, restoring the implement to the condition shown in FIG. 1.

While the regular draft control is not normally utilized with the above arrangement, it is to be noted that the overload release which forms a part of such draft control mechanism is nevertheless effective. Thus upon striking a buried obstruction, the excessive compression force applied to the upper link 16, acting through the lever 17, insures that the draft linkage remains free with respect to the tractor. Thus the draft force tends to reduce the traction at the rear wheels so that they may spin with respect to the ground in accordance with the well-known action of this type of draft linkage and as described in the above Bunting application.

In the event that it is desired to change the degree of penetration of the scarifier blades relative to the scraper blade, the notch 85 on the latch bar may be located at a slightly different level. If desired, a further notch may be provided between the present notches 85 and 86 for lesser scarifier penetration.

While the implement has been described in connection with forward scraping, provision is also made for scraping in the reverse direction. For this purpose an auxiliary blade 90 is pivoted horizontally at 91 to the back side of the regular blade 40. The end panels moreover are extended rearwardly as shown, forming stops 92 to support and define the scraping position of the auxiliary blade. It will be understood that during the time the regular blade is used, the auxiliary blade leaves its stops so that it does not interfere with the forward scraping action.

We claim as our invention:

1. For use with a tractor having a pair of draft links trailingly pivoted at its rear end portion together with power operated lift means for raising the draft links and a compression link centered above the draft links, the combination comprising a horizontally arranged tool bar frame pinned to the trailing ends of the links, a set of scarifier blades mounted side by side on said tool bar frame substantially the width of the tractor, a scraper blade arranged vertically behind the scarifier blades and spaced rearwardly therefrom, a parallelogram linkage including lower and upper horizontal links interconnecting the tool bar frame and the scraper blade and pivoted to each of them, and means for rigidifying the parallelogram linkage in a plurality of positions.

2. For use with a tractor having a pair of draft links trailingly pivoted at its rear end portion together with power operated lift means for raising the draft links and a compression link centered above the draft links, the combination comprising a horizontally arranged tool bar frame pinned to the trailing ends of the links, a set of scarifier blades mounted side by side on said tool bar frame substantially the width of the tractor, a scraper blade arranged vertically behind the scarifier blades and spaced rearwardly therefrom, a linkage interconnecting the tool bar frame and the scraper blade including pairs of elongated links disposed on opposite sides of the scraper blade, means pivotally connecting the ends of said links respectively to said frame and said scraper blade, the pivots for said links being so located that when the tool bar frame is moved vertically with respect to the scraper blade the scraper blade is supported and maintained in substantially vertical position, and means for locking the linkage to maintain the tool bar frame upraised with respect to the scraper blade for independent use of the scraper blade.

3. For use with a tractor having a pair of draft links trailingly pivoted at its rear end portion together with power operated lift means for raising the draft links and a compression link centered above the draft links, the combination comprising a horizontally arranged tool bar pinned to the trailing ends of the draft links and having a vertical frame rigid therewith for pinning to the trailing end of the compression link, a set of scarifier blades mounted side by side on said tool bar and extending substantially the width of the tractor, a scraper blade arranged vertically behind the scarifier blades and spaced rearwardly therefrom, a parallelogram linkage including lower and upper horizontal links interconnecting the tool bar and scraper blade and pivoted to each of them, and means for rigidifying the parallelogram linkage in a first position in which the scarifier blades and scraper blade are in simultaneous ground engagement and a second upwardly jack-knifed position in which the scarifier blades are clear of the ground with the scraper blade only in ground engagement.

4. For use with a tractor having a pair of draft links trailingly pivoted at its rear end portion together with power operated lift means for raising the draft links and a compression link centered above the draft links, the combination comprising a horizontally arranged tool bar pinned to the trailing ends of the draft links and having a vertical frame rigid therewith for pinning to the trailing end of the compression link, a set of scarifier blades mounted side by side on said tool bar substantially the width of the tractor, a scraper blade arranged vertically behind the scarifier blades and spaced rearwardly therefrom, a parallelogram linkage including lower and upper horizontal links interconnecting the tool bar and the scraper blade and pivoted to each of them, and means including a latch bar for latching together adjacent elements of the parallelogram and thus rigidifying the parallelogram linkage in a plurality of positions.

5. For use with a tractor having a pair of draft links trailingly pivoted at its rear end portion together with power operated lift means for raising the draft links and a compression link centered above the draft links, the combination comprising a horizontally arranged tool bar pinned to the trailing ends of the draft links and having a vertical frame rigid therewith for pinning to the trailing end of the compression link, a set of scarifier blades mounted side by side on said tool bar and extending substantially the width of the tractor, a scraper blade having a frame and arranged vertically behind the scarifier blades and spaced rearwardly therefrom, a parallelogram linkage including lower and upper horizontal links interconnecting the tool bar and the scraper blade, and a latch bar extending upwardly from said scraper blade frame and having means for latched engagement of the upper horizontal link at two levels thereon corresponding to the scarifier blades' being in ground engagement and upraised clear of the ground, and manual means operable from the tractor seat for releasing the latch bar from engagement with the upper horizontal link.

6. For use with a tractor having a pair of trailingly pivoted draft links horizontally spaced from one another with power elevated means for raising the draft links as well as a compression link centered above the draft links, the combination comprising a horizontal tool bar frame extending transversely the width of the tractor and having means for coupling the same to the trailing ends of the links, a scraper blade, a parallelogram linkage including upper and lower horizontal links pivoted at the rear ends to the scraper blade at vertically spaced points and pivoted at their rear ends to the tool bar frame at vertically spaced points with pivot points defining the corners of the parallelogram, and means for rigidifying adjacent sides of the parallelogram (a) in a first relative position in which the scarifier blades are in ground engagement and (b) in a second relative position in which the scarifier blades are upraised out of contact with the ground and with the weight thereof resting upon said scraper.

7. For use with a tractor having a pair of draft links trailingly pivoted at its rear end portion horizontally spaced in one another with power operated means for elevating the same and with a trailingly pivoted compression link centered above them, the combination comprising a horizontal transversely extending tool bar pivoted to the trailing ends of the draft links, a vertical frame rigid with said tool bar and having means at its upper end for pivoting to the trailing end of the compression link, a scraper box including a vertical transversely arranged scraper blade having end panels for retaining the dirt scraped by the blade, a pair of lower horizontal links pivoted to the end panels of the scraper box at their rear ends and pivoted to the tool bar at their forward ends for dragging the scraper box behind the tool bar, an upper horizontal link pivoted to the top of the scraper blade at its rear end and to the vertical frame at its forward end for preventing forward toppling movement of the scraper blade as it is drawn along the ground by the lower horizontal links, and a vertical latch bar interconnecting the upper horizontal link with the scraper box for latching the central portion of the upper link in a predetermined spaced relation with respect to the front portion of the scraper box, said latch bar having a first latching position in which the tool bar and scarifier blades are lowered in working position and a second latching position in which the tool bar and scarifier blades are upraised in inactive position thereby to permit alternative types of operation in which the scraper blade may be employed (a) with the scarifier blades and (b) without interference from said scarifier blades.

8. For use with a tractor having a pair of draft links trailingly pivoted at its rear end portion together with power operated lift means for raising the draft links and a compression link centered above the draft links, the combination comprising a horizontally arranged tool bar pinned to the trailing ends of the draft links and having a vertical frame rigid therewith for pinning to the trailing end of the compression link, a set of scarifier blades mounted side by side on said tool bar, a scraper blade arranged vertically behind the scarifier blades and spaced rearwardly therefrom, a linkage connecting the tool bar frame and the scraper blade, means for rigidifying the linkage so that the scraper blade alone contacts the ground with the tool bar and scarifier blades held in upraised position, spring biasing means interconnecting the scraper blade and the tool bar for biasing the tool bar downwardly so that when the rigidifying means is released the scarifier blades moves promptly downward into ground engagement.

References Cited in the file of this patent

UNITED STATES PATENTS

| | | |
|---|---|---|
| 2,578,131 | Gannon | Dec. 11, 1951 |
| 2,611,308 | Morkoski | Sept. 23, 1952 |
| 2,737,868 | Morkoski | Mar. 13, 1956 |
| 2,839,851 | Geiszler | June 24, 1958 |
| 2,840,933 | Brem | July 1, 1958 |
| 2,840,935 | Bird | July 1, 1958 |
| 2,865,117 | Davis | Dec. 23, 1958 |

FOREIGN PATENTS

| | | |
|---|---|---|
| 472,839 | Germany | Mar. 8, 1929 |